United States Patent
Walz et al.

(10) Patent No.: US 11,432,374 B2
(45) Date of Patent: Aug. 30, 2022

(54) PTC HEATING DEVICE AND METHOD FOR ITS MANUFACTURE

(71) Applicant: Eberspächer catem GmbH & Co. KG, Herxheim (DE)

(72) Inventors: Kurt Walz, Hagenbach (DE); Michael Niederer, Kapellen-Drusweiler (DE); Ahmad Asafi, Karlsruhe (DE); Tobias Semmler, Niederkirchen (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 0 days.

(21) Appl. No.: 17/240,637

(22) Filed: Apr. 26, 2021

(65) Prior Publication Data

US 2021/0337631 A1    Oct. 28, 2021

(30) Foreign Application Priority Data

Apr. 27, 2020 (DE) .................. 10 2020 205 305.7

(51) Int. Cl.
| | |
|---|---|
| H05B 3/28 | (2006.01) |
| B32B 27/28 | (2006.01) |
| B32B 7/12 | (2006.01) |
| B32B 15/08 | (2006.01) |
| B32B 37/12 | (2006.01) |

(52) U.S. Cl.
CPC .............. *H05B 3/283* (2013.01); *B32B 7/12* (2013.01); *B32B 15/08* (2013.01); *B32B 27/281* (2013.01); *B32B 27/288* (2013.01); *B32B 37/12* (2013.01); *B32B 2255/10* (2013.01); *B32B 2264/107* (2013.01); *H05B 2203/016* (2013.01); *H05B 2203/017* (2013.01); *H05B 2203/02* (2013.01)

(58) Field of Classification Search
CPC ................................ B32B 18/00; H05B 3/283
See application file for complete search history.

(56) References Cited

U.S. PATENT DOCUMENTS

| | | | |
|---|---|---|---|
| 2015/0168014 A1* | 6/2015 | Wu | .......................... F24H 1/009 |
| | | | 219/202 |
| 2016/0360572 A1* | 12/2016 | Bohlender | ............... H05B 3/06 |

FOREIGN PATENT DOCUMENTS

| | | |
|---|---|---|
| EP | 1768458 A1 | 3/2007 |
| EP | 3416456 A1 | 12/2018 |
| EP | 3515152 A2 | 7/2019 |
| EP | 3515152 A3 | 10/2019 |

* cited by examiner

*Primary Examiner* — Zachary M Davis
(74) *Attorney, Agent, or Firm* — Boyle Fredrickson S.C.

(57) ABSTRACT

A PTC heating device exhibits a good degree of efficiency while providing good electrical insulation of the device's PTC element. The insulation of the PTC heating device comprises a film and a layer that is bonded to the film and made of brown compact which comprises non-sintered ceramic particles. Also disclosed is a method in which ceramic particles are provided with a binding agent, and the mass thus produced is applied in a planar manner onto a film and bonded to the film. The multilayer insulation thus produced is placed around the PTC element and the conductor tracks, and the binding agent is subsequently removed, at least in part.

11 Claims, 1 Drawing Sheet

PTC HEATING DEVICE AND METHOD FOR ITS MANUFACTURE

BACKGROUND OF THE INVENTION

1. Field of the Invention

The present invention relates to a PTC heating device and a method for its manufacture. A generic PTC heating device has a PTC element and, typically, two conductors connected thereto in an electrically conductive manner which are provided and configured to energize the PTC element with different polarities. The PTC heating device further has insulation covering the PTC element.

2. Background of the Invention

A PTC heating device of the aforementioned kind is known from EP 1 768 458 A1. In this PTC heating device, the PTC element is disposed in an electrically insulating position frame which has a receptacle formed to be adapted to receive the PTC element. This receptacle surrounds the cuboid-shaped PTC element circumferentially so that the heat-emitting main side surfaces of the PTC element are exposed in the recesses. A two-layer insulation composed of a ceramic plate and a plastic film is placed against these main side surfaces. The plastic film and the ceramic plate are bonded to one another. In this prior art, a two-layer insulation is provided for the reason that it is feared that the ceramic plate fractures under mechanical stress and that electrical insulation must be ensured under all circumstances due to the use of the PTC heating device in a high-voltage motor vehicle.

A PTC heating device of the generic kind is known from EP 3 515 152 A1. In this PTC heating device, the conductor tracks are formed by a wire mesh filled with a conductive mass. The individual bonds of the wire mesh are used to establish electrical contact with the PTC element. The free spaces within the mesh are filled with the thermally highly conductive mass, which is electrically non-conductive. The mass contains ceramic particles that are highly conductive. A ceramic plate, which is formed by sintered ceramic particles, covers the conductor tracks from the outside.

In an alternative proposal as a solution according to EP 3 416 456 A1, the insulation is formed by two prefabricated shell elements that capture the PTC element and the conductor tracks between them and form passage openings for connection lugs via which the PTC element is energized and which are exposed on the outer side of the Insulation.

The prior art examples discussed above show the professional efforts, on the one hand, to obtain sufficient electrical contact with the PTC element, but, on the other hand, to ensure good heat extraction of the heat generated by the PTC element, which is essential for good efficiency, at least via the oppositely disposed main side surfaces of the PTC element without significant thermal resistance to the degree possible. The main side surfaces are those surfaces of the cuboid-shaped PTC element that have the largest dimension

SUMMARY

The present invention is based on the object of specifying a PTC heating device of the kind mentioned at the outset, which exhibits a good degree of efficiency while providing good electrical insulation of the PTC element. The present invention also aims to provide a method for the manufacture of such a PTC heating device.

To satisfy the object in terms of the device, the present invention proposes a PTC heating device including a PTC element, conductor tracks, connected to the PTC element in an electrically conductively manner, for energizing the PTC element with different polarities, and an insulation covering the PTC element. The insulation comprises a film and a layer that is bonded to the film and that is made of a brown compact which comprises non-sintered ceramic particles.

Also disclosed is a method for the manufacture of a PTC heating device including h a PTC element, conductor tracks connected to the PTC element in an electrically conductively manner for energizing the PTC element with different polarities, and an insulation covering the PTC element. The method includes providing ceramic particles with a binding agent to produce a mass, applying the mass in a planar manner onto a film, bonding the mass to the film to produce a multilayer insulation, placing the multilayer insulation around the PTC element and the conductor tracks, and then removing at least part of the binding agent.

An intermediate product is in powder metallurgy typically referred to as a brown compact. When processing powders made of metals or ceramics for the manufacture of sintered parts, the powder is typically mixed with a binding agent. This binding agent can comprise various components which, firstly, are formed to be adapted in terms of the adhesion to the surface of the particles and, secondly, should have the adhesion properties and rheological properties required for flowing without the components of the suspension separating. The different components can be mixed with the particles one after the other or at the same time. The suspension thus produced is highly filled. The phase of the suspension being liquid at processing temperature should wet the particles and allow them to flow in a continuum without mixing.

In powder metallurgy, such a mass is processed as granulated material in an injection molding tool or an extruder. The binding agent is there typically fused on thermally. After the mass has been shaped, the binding agent, which is entirely or in part thermoplastic material, typically solidifies. In powder metallurgy, this shaping process is followed by a releasing agent. With these releasing agents, the binding agent representing the processing aid is at least predominantly removed from the green compact. The remaining powder feedstock is then sintered in order to obtain a metallic or ceramic sintered part.

This processing can there be guided by the consideration that remaining residues of the binding agent bond the ceramic or metallic particles to one another until sintering, so that there is no loose powder feedstock at any time. Because such a powder feedstock, which consists only of the particles, would lose its previously given shape due to gravity or in the event of the slightest vibrations.

After all this, and also in the sense of the present invention, the brown compact is a molded part or semi-finished product that has at least predominantly been freed from the binding agent, which in prior art is the starting point for the sintering process.

With the PTC heating device according to the invention, the particles are initially provided with a binding agent in a manner that may be known per se. The basically flowable mass thus produced is applied onto a film, in particular an electrically non-conductive film, and bonded thereto. The bond can be created by the binding agent. The bond, however, can also be effected by way of an adhesive layer which has been applied onto the film prior to applying the mass.

The film may be an electrically insulating film, for example, a polyimide film or a film made from PEEK polymer material.

During this processing step, the mass is typically substantially free of cavities or defects. The binding agent fills all free spaces between the ceramic particles. The mass is a highly filled suspension. It can be processed in a flowable manner. The mass can be applied to the film, for example, by blade coating or extrusion.

The film has a relatively small thickness of between 0.015 and 0.03 mm. One side of the film can be provided with heat-resistant adhesive. This adhesive is typically applied over the entire surface onto the film. The mass is likewise applied over the entire surface as a continuous further layer, typically having a uniform thickness. Before removing the binding agent, the mass may have a thickness of 0.1 to 1.0 mm.

In the method according to the invention, the multilayer insulation thus produced is placed around the PTC element and the conductor tracks. The binding agent is subsequently removed, at least in part. The binding agent allows the insulation to be deformed without having to worry that the ceramic particles are no longer present in the finished products with the desired uniform distribution. In contrast to a sintered ceramic layer, the mass with the binding agent content can still be plastically deformed.

The mass containing the particles can then first be applied onto the film and the multilayer insulation can thereafter be placed around the PTC element and the conductor tracks. At least one face side of the PTC element can there be surrounded by the insulation. The insulation typically covers the entire surface of the PTC element and the conductor tracks. The multilayer insulation may project at the edge beyond the PTC element or the conductor tracks. In other words, the insulation protrudes laterally beyond the main side surfaces, as a result of which the air and creepage distances are increased.

The mass is flowable by itself and it is then conceivable to insert the PTC element with the conductor tracks attached thereto into an injection mold and to completely surround it with the mass. The PTC element can there be held by connecting lugs which are formed by the conductor tracks and which typically protrude on one side of the PTC element which is surrounded by the mass.

In this alternative procedure, the binding agent can be removed from the injection mold after demolding. The film can be applied at the beginning, during or at the end of the removal of the binding agent. In order to allow the binding agent to escape as freely as possible, the film should only be applied relatively late in the course of this process step. On the other hand, the film must be bonded to the ceramic particles before an excessive loss of binding agent makes the shape of the ceramic particles unstable.

The binding agent can be removed chemically or thermally in a furnace. The removal of the binding agent can also be entirely or in part be effected during the final electrical test of the PTC heating device. During this final test, the PTC element is energized and the heat extraction of the PTC element is verified. This initial power-up of the PTC heating device can also be used to remove the binding agent.

Due to the above-described thickness ratios between, firstly, the film and, secondly, the mass, it is beneficial to provide the brown compact on the inner side of the insulation facing the PTC element and the film on the outer side. The brown compact has a CTI value of >800, more typically >1000. The CTI value of the brown compact is higher by around a factor of 3 than the CTI value of a film made of PEEK or polyimide material. This significantly improves the dielectric strength of the insulation. The brown compact can absorb any possible roughness on the surface of the PTC element and thereby compensate for it. The brown compact then abuts in a planar manner against a rough surface. The conductor tracks may be formed from sheet metal and as a contact surface accordingly also form the connection lugs. The conductor tracks, however, can be attached to the face sides of the PTC element so that the insulation is abutted directly against a surface of the PTC element. This surface of the PTC element is formed by the PTC element itself, where a metallization applied onto the PTC element for introducing current into the PTC element is also regarded by the present invention as being a component of the PTC element.

The conductor track can also be formed by a film which is arranged between the insulation and the PTC element. This film can be bonded directly to the PTC element before the PTC element is enveloped with the mass, or it can be provided as a further, inner layer on the insulation that is still flat before it is connected to the PTC element. An electrically conductive metallic film or a total of two metallic films can be provided on oppositely disposed sides of the insulation. The films typically protrude on one side at least in part over the main side surface of the PTC element. Power current is there introduced via the film for energizing the latter with different polarities. In this case, the film forming the conductor track can be that film onto which the brown compact is applied, so that the insulation can comprise an electrically conductive film and the brown compact or can be formed from these two components.

Aluminum oxide particles may be used as ceramic particles in a manner known per se. These aluminum oxide particles are not sintered in the finished product. However, the layer of insulation containing the ceramic particles is not completely filled with a binding agent; i.e. plastic material, as is known from EP 3 515 152 A1. The layer of insulation containing the ceramic particles, i.e. the brown compact, substantially comprises the ceramic particles and possibly a remainder of the binding agent which bonds the sintered particles to one another at their contact surfaces, but without creating a continuum. In the thickness direction of the layer made from the brown compact, there is accordingly a lack of a path at a right angle to the main side surface of the PTC element, which path being formed solely or predominantly by the binding agent. The brown compact can contain no or almost no binding agent. The proportion of the binding agent in the sintered part is generally not more than 10% of that binding agent material of the original mass that was substantially processed as a liquid. The porosity in the layer formed from the brown compact is at least 35% by volume, more typically at least 60% by volume. Practical tests have shown that, until completion of the insulation and after the binding agent has been expelled at temperatures of up to 350° C., the total loss of mass is around 12-15% by volume.

After the removal of the binding agent to produce the brown compact, approximately the same properties as those of a sintered ceramic are obtained. The dielectric strength is at at least 3,000 V with a leakage current of >100 µA. The insulation strength at a voltage of 500 VDC is at least 100 GΩ.

Processing the mass together with the film allows for good shaping. In particular, the insulation can be bent, which would not be possible with an already sintered ceramic without the mechanical failure thereof. Nevertheless, the insulation with the brown compact also provides a stable mold-produced part.

The thermal conductivity of the brown compact is relatively high and is at least 1 W/(m K), more typically at least 2 W/(m K) and therefore above the thermal conductivity of a PEEK polymer or the thermal conductivity of a polyimide material, respectively. The particular nature of the insulation, however, lies in the high dielectric strength while having a small thickness. The insulation according to the present invention for this purpose does not have to be thicker than 0.3 mm Such insulation has a CTI value of at least 1000, which is required for on-board electrical system voltages for operating the PTC heating device in a motor vehicle at a voltage of at least 800V.

BRIEF DESCRIPTION OF THE DRAWINGS

Further details of the present invention will become apparent from the following description of an embodiment in combination with the drawings, which drawings show

DETAILED DESCRIPTION

Figure 1:
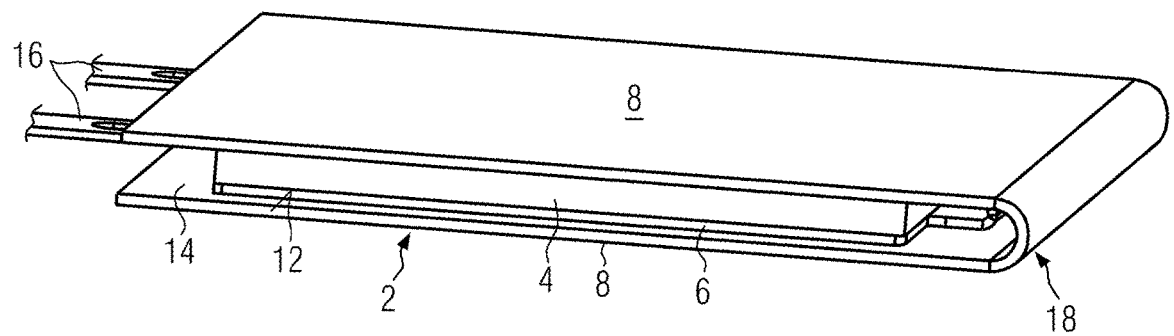
FIG. 1 is an elevated perspective side view of the embodiment and FIG. 2 is an enlarged perspective side view of an open end of the embodiment.

FIG. 1 depicts a PTC heating device 2 with a PTC element 4. The PTC heating device 2 furthermore has two conductor tracks 6 in form of sheet metal pieces. The outside of the PTC heating device 2 is formed by an insulation comprising a film 8 and a layer made of a brown compact 10, which results from a green body comprising ceramic powder particles and binder, which brown compact is achieved by fully or at least partially debindering the green compact.

The conductor tracks 6 are abut against main side surfaces 12 of the PTC element 4, which main side surfaces 12 are arranged opposite to each other and are the largest surfaces of the PTC element 4. Those main side surfaces 12 are connected by a circumferential rim of the PTC element 4. The inner surface opposite to the conductor tracks 6 of the layer of the brown compact 10 is covered by a metallic film 14, which metallic film 14 is in direct contact with the assigned conductor track. Alternatively, conductor tracks can be formed by the metallic film and not by sheet metal parts.

Figure 2:
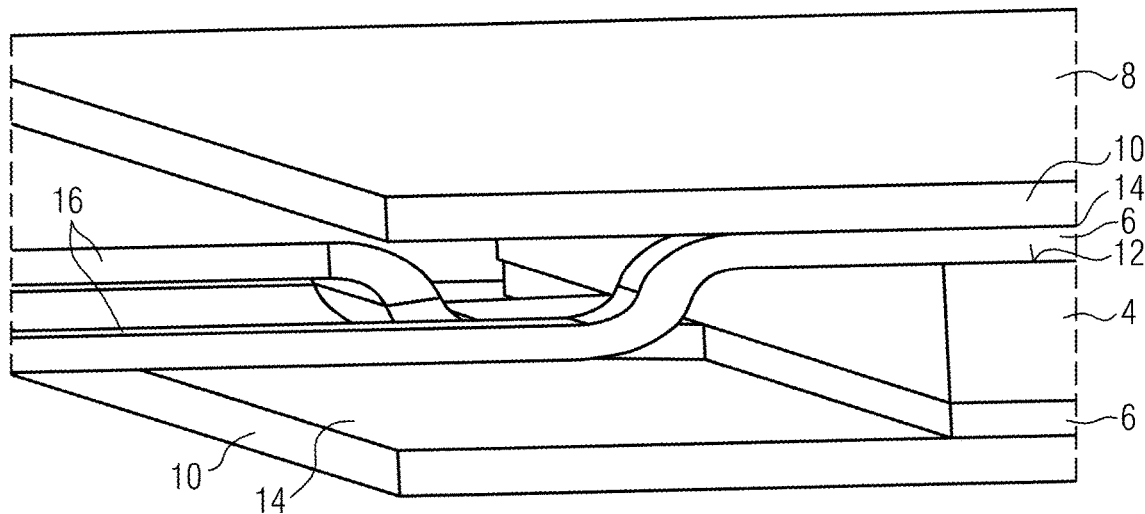

In the present embodiment, the sheet metal parts define contact lugs 16. In the variant, in which the metallic film provides for the conductor tracks, the free ends shown on the left-hand side of FIG. 2 of the metallic film 14 are each connected with such contact lugs or provide for such contact lugs. Such contact lugs may also be formed by cutting out a portion of the film 8, the brown compact 10 and the metallic film 14 applied on the inner surface of the brown compact layer.

A face side 18 of the insulation is wrapped around the PTC element 4 and the conductor tracks 6. In the embodiment in which a metallic film 14 is provided on the inner side of the insulation, respective film 14 is removed at least at said face side 18 to avoid short circuit between opposing main side surfaces 12 of the PTC element 4 which are assigned to different polarity.

The invention claimed is:

1. A PTC heating device comprising:
a PTC element;
conductor tracks, connected to the PTC element in an electrically conductively manner, for energizing the PTC element with different polarities; and
an insulation covering the PTC element, wherein the insulation comprises a film and a layer that is bonded to the film and that is made of a brown compact which comprises non-sintered ceramic particles and a residual amount of a binder agent, wherein the residual amount is not more than 10% by volume of the total binder agent originally contained in the brown compact.

2. The PTC heating device according to claim 1, wherein the insulation surrounds oppositely disposed main side surfaces of the PTC element as a uniform insulating layer, and wherein at least one face side of the insulation layer is wrapped around the PTC element and the conductor tracks.

3. The PTC heating device according to claim 1, wherein the brown compact is arranged on an inner side of the insulation facing the PTC element, and wherein the film is arranged on an outer side of the insulation.

4. The PTC heating device according to claim 3, wherein the film is an electrically insulating film, and wherein a metallic film is provided between the electrically insulating film and the PTC element.

5. The PTC heating device according to claim 1, wherein the layer of the insulation is at least predominately freed from a binding agent.

6. The PTC heating device according to claim 1, wherein the conductor tracks extend beyond the insulation to form contact lugs for the PTC heating device.

7. A method for the manufacture of a PTC heating device including a PTC element, conductor tracks connected to the PTC element in an electrically conductively manner for energizing the PTC element with different polarities, and an insulation covering the PTC element, the method comprising:
providing ceramic particles with a binding agent to produce a mass;
applying the mass in a planar manner onto a film;
bonding the mass to the film to produce a multilayer insulation;
placing the multilayer insulation around the PTC element and the conductor tracks; and then
removing at least at least 90% by volume of the binding agent.

8. The method according to claim 7, wherein the binding agent is removed chemically or in a furnace.

9. The method according to claim 7, wherein the binding agent is removed during a final electrical test of the PTC heating device.

10. The method according to claim 7, wherein the film is provided with an adhesive layer and the mass is applied onto the adhesive layer.

11. The method according to claim 7, wherein a metallic film is applied as a conductor track onto the film.

* * * * *